(12) United States Patent
Sauber

(10) Patent No.: US 7,383,365 B2
(45) Date of Patent: Jun. 3, 2008

(54) METHOD AND SYSTEM FOR PCI EXPRESS AUDIOVISUAL OUTPUT

(75) Inventor: William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 770 days.

(21) Appl. No.: 10/621,069

(22) Filed: Jul. 16, 2003

(65) Prior Publication Data

US 2005/0012747 A1   Jan. 20, 2005

(51) Int. Cl.
- *G06F 3/00* (2006.01)
- *G06F 13/00* (2006.01)
- *G06F 15/00* (2006.01)
- *G06F 12/00* (2006.01)

(52) U.S. Cl. .......................... 710/38; 710/29; 710/30; 710/31; 710/32; 710/100; 710/305; 345/501; 711/2

(58) Field of Classification Search ............ 710/29–32, 710/38, 100, 305–317; 345/501, 503, 519, 345/537, 541–542; 711/2
See application file for complete search history.

(56) References Cited

U.S. PATENT DOCUMENTS

| | | | |
|---|---|---|---|
| 6,141,709 A * | 10/2000 | Cutter | 710/100 |
| 6,346,946 B1 * | 2/2002 | Jeddeloh | 345/503 |
| 2002/0122046 A1 * | 9/2002 | Dischert et al. | 345/629 |
| 2003/0046472 A1 | 3/2003 | Morrow | 710/305 |
| 2003/0081391 A1 | 5/2003 | Mowery et al. | 361/764 |
| 2005/0144468 A1 * | 6/2005 | Northcutt et al. | 713/189 |
| 2006/0259642 A1 * | 11/2006 | Du et al. | 709/247 |

OTHER PUBLICATIONS

U.S. Patent Application entitled "System and Method for Using a Switch to Route Peripheral and Graphics Data on an Interconnect" naming William F. Sauber as the inventor, given U.S. Appl. No. 10/386,743 and filed Mar. 11, 2003.

* cited by examiner

*Primary Examiner*—Alan S Chen
(74) *Attorney, Agent, or Firm*—Hamilton & Terrile, LLP; Robert W. Holland

(57) ABSTRACT

Audio and visual information processing components are co-located on a PCI Express graphics card by communicating audio and visual information received through the PCI Express interface of the graphics card to a PCI Express switch which switches audio information to audio processing components and video information to video processing components for processing of the information to an audiovisual appliance output. The audio processing components may include an AC97 interface and CODEC or an audio controller that processes PCI Express information. The audiovisual output signal may include a variety of combined or separate audiovisual appliance compatible outputs such as coaxial cable output, EVC output, HDMI output, HDTV output or 1394 output.

21 Claims, 1 Drawing Sheet

METHOD AND SYSTEM FOR PCI EXPRESS AUDIOVISUAL OUTPUT

BACKGROUND OF THE INVENTION

1. Field of the Invention

The present invention relates in general to the field of information handling system audiovisual output, and more particularly to a method and system for PCI Express audiovisual output.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A growing use of information handling systems is for the presentation of multimedia information, such as audiovisual information having video information for display on a monitor and audio information for play through speakers. In a typical information handling system, video information is prepared for display on a graphics card interfaced with a monitor and audio information is prepared for playing on an audio card interfaced with external speakers. Generally, the presentation of audiovisual information by information handling systems is performed in a manner inconsistent with the presentation of audiovisual information by typical audiovisual appliances, such as televisions. For example, televisions typically accept audiovisual information in an analog format through a single input while information handling systems typically process audiovisual information as digital data output with separate video and audio outputs. However, a number of industry standards support audio and video output from a single information handling system connector, such as data encoded into a single channel, like 1394 and HDTV connectors, or data encoded on separate electrical interfaces using a single connector, like HDMI and EVC connectors. Generally, in order to support communication of audiovisual information to appliances through single connector interfaces, an information handling system must include a mechanism that co-locates audio and video streams.

One standard interface for communication of information for an information handling system is the PCI Express standard. PCI Express graphics interfaces have a 16 lane width that is generally not compatible with communication of audio and video information to a graphics card as separate streams. Typically, PCI Express audio and visual outputs from an information handling system are handled separately within the information handling system. For example, video information is communicated from a memory hub to a graphics card over one PCI Express link for output through a video adapter while audio information is communicated from the memory hub through separate PCI Express links through an audio device to an audio output. The PCI Express standard lacks a defined mechanism to co-locate audio and video stream outputs from an information handling system. One solution that allows co-location of video and audio streams output from an information handling system is the use of a PCI bridge on a graphics card to allow support for multiple devices on a single card. However, PCI bridges tend to present a relatively expensive and complex solution for co-location of video and audio streams.

SUMMARY OF THE INVENTION

Therefore a need has arisen for a method and system which co-locates output of video and audio information from a PCI Express graphics card.

In accordance with the present invention, a method and system are provided which substantially reduce the disadvantages and problems associated with previous methods and systems for co-locating the output of video and audio information from a PCI Express graphics card. A PCI Express switch routes video and audio information to video and audio processors of the graphics card so that the PCI Express graphics card co-locates video and audio output to an audiovisual appliance interface.

More specifically, audio and visual information generated by information processing components is communicated to a PCI Express graphics card over a PCI Express interface. A PCI Express switch located on the graphics card accepts the audio and visual information and routes the audio information to an audio device and the video information to a video controller for processing of the information to output an audiovisual appliance signal. The audio device is, for instance, an AC97 interface that accepts PCI Express audio information and provides the audio information to a CODEC as AC97 formatted information. Alternatively, the audio device is an audio processor that accepts and processes PCI Express audio information. The video controller and audio processor convert the respective switched streams of video or audio information for encoding to a desired output, such as an encoded output or a standard interface for communicating with an audiovisual appliance, such as HDTV, 1394, HDMI, or EVC signal outputs from a single connector adapted to present audiovisual information at an audiovisual appliance.

The present invention provides a number of important technical advantages. One example of an important technical advantage is that audiovisual output is co-located on a PCI Express graphics card so that audiovisual information is communicated from a single output connector compatible with standard interfaces for communicating with audiovisual appliances. The PCI Express switch routes the audio and visual information received at the PCI Express graphics card with an inexpensive and reliable solution so that audio information is combined with video information across the 16 bit PCI Express bus without degradation in the transfer of the information or separate handling of the audio information at the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
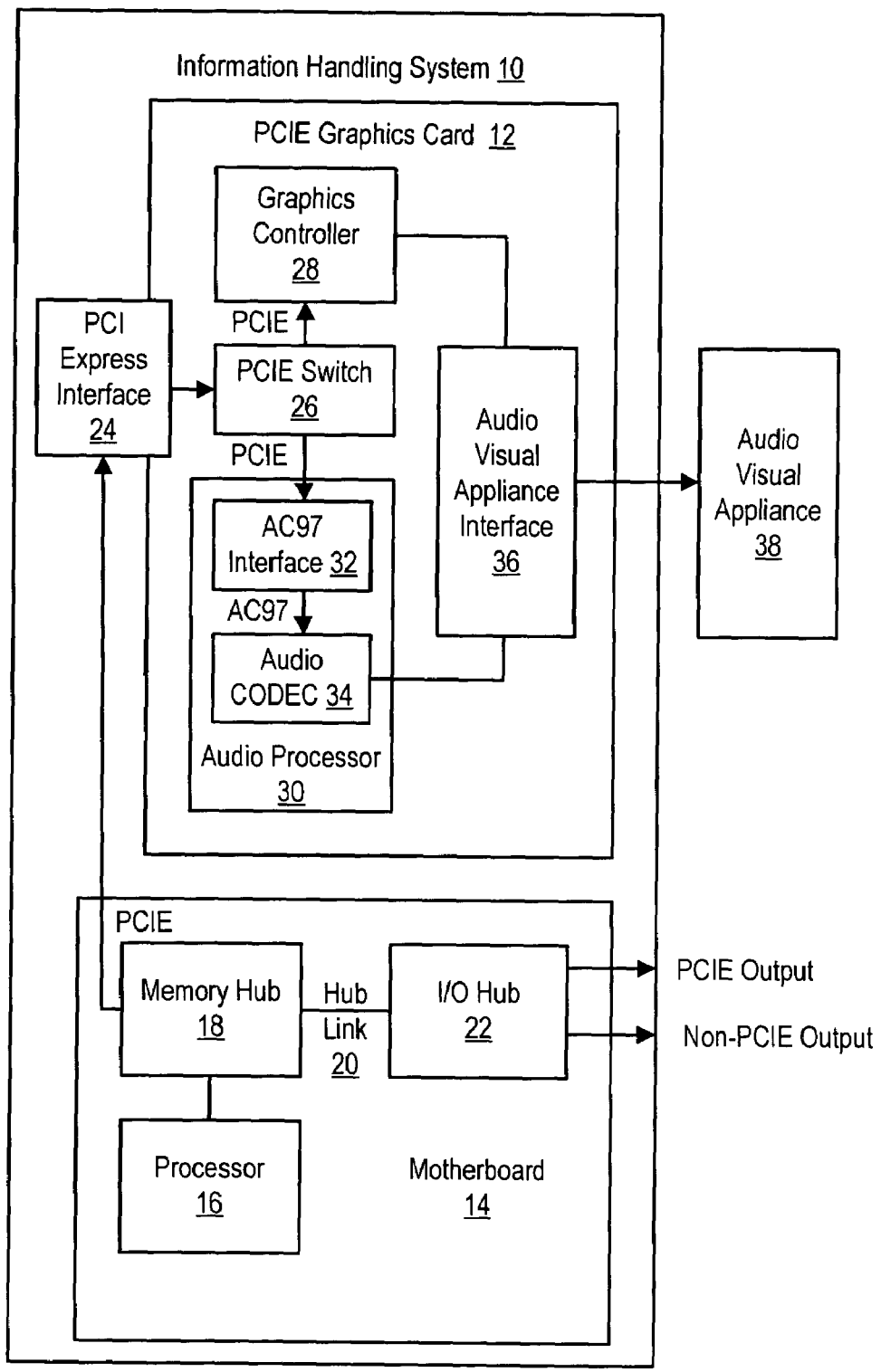
FIG. 1 depicts a block diagram of an information handling system having an audiovisual PCI Express graphics card.

Audio and visual output from an information handling system are coordinated through a PCI Express graphics card that co-locates audio and visual processing components to generate output for an audiovisual appliance. A PCI Express switch accepts audio and visual information communicated to the PCI Express graphics card and switches the audio and visual information to appropriate processing components for generation of an audiovisual signal communicated to an audiovisual appliance. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a block diagram depicts an information handling system 10 configured to output both audio and visual information to an audiovisual appliance from a PCI Express graphics card 12. Information handling system 10 generates the audio and visual information with information processing components disposed on a motherboard 14, such as a processor 16 that outputs audio and visual information to a memory hub 18. Memory hub 18 directs output through a hub link 20 to an Input/Output hub 22 for output to PCI Express devices and non-PCI Express devices. Memory hub 18 also directs PCI Express audio and visual information to PCI Express graphics card 12, such as in compressed and encoded MPEG format.

Audio and visual information sent from memory hub 18 is sent through PCI Express interface 24 to a PCI Express switch 26 for distribution to video and audio processing components to generate an output signal for an audiovisual appliance. PCI Express switch 26 switches information received through PCI Express interface 24 so that video information switches to a graphics controller 28 and audio information switches to an audio processor 30. In the embodiment depicted by FIG. 1, audio processor 30 accepts PCI Express information with an AC97 interface 32 that converts the information to an AC97 signal for handling by an audio CODEC 34. In an alternative embodiment, audio processor 30 is an audio controller that directly accepts PCI Express information for conversion to an audio output signal. Graphics controller 28 and audio processor 30 output video and audio signals respectively to an audiovisual appliance interface 36 for output to an audiovisual appliance 38.

PCI Express graphics card 12 allows a standard graphics card link to support data for co-located video and audio controllers with PCI Express switch 26 directing data as appropriate for processing by the video and audio controllers. Co-location of video and audio controllers supports the driving of external peripherals from a single output connector to eliminate or reduce the use of nonstandard cables. PCI Express switch 26 routes the data to the proper controller with the outputs of the controllers either encoded or driven directly out of a standard interface. For instance, audiovisual appliance interface 36 outputs to a single channel appliance interface, such as HDTV co-axial or 1394 interfaces, or to multiple channel appliance interfaces, such as HDMI and EVC, using a single connector or a wired/wireless network interface. Block 36 might include data compression and/or encryption hardware to allow more efficient transmission of data and protect against misuse of content. Blocks 26-36 may be integrated into fewer distinct semiconductor devices or partitioned into more distinct semiconductor devices. Information handling system output to graphics card 12 is through a PCI Express interface having a standard 16 bit link that communicates both the audio and visual information.

Although the present invention has been described in detail, it should be understood that various changes, substitutions and alterations can be made hereto without departing from the spirit and scope of the invention as defined by the appended claims.

What is claimed is:

1. An information handling system comprising:
   information processing components configured to output audio and visual information to a PCI Express interface;
   a graphics card having a PCI Express interface in communication with the audio and visual information output by the information processing components and an audiovisual appliance interface operable to output audiovisual information to an audiovisual appliance;
   a graphics controller coupled to the graphics card and operable to process visual information of the information processing components for output to the audiovisual appliance interface;
   audio processing components coupled to the graphics card and operable to process audio information of the information processing components for output to the audiovisual appliance interface;
   a PCI Express switch coupled to the graphics card, the PCI Express switch disposed between the PCI Express interface, the graphics controller and the audio processing components, and operable to switch visual information from the PCI Express interface to the graphics controller and audio information from the PCI Express interface to the audio processing components.

2. The information handling system of claim 1 wherein the audio processing components comprise:
   an AC97 interface operable to accept the audio information from the PCI Express switch for output to a CODEC; and
   a CODEC operable to accept the audio information from the AC97 interface and to output the audio information to the audiovisual appliance interface.

3. The information handling system of claim 1 wherein the audio processing components comprise an audio controller operable to accept the audio information from the PCI Express switch and to output the audio information to the audiovisual appliance interface.

4. The information handling system of claim 1 wherein the audiovisual appliance interface comprises a coaxial cable output.

5. The information handling system of claim 1 wherein the audiovisual appliance interface comprises a HDMI output.

6. The information handling system of claim 1 wherein the audiovisual appliance interface comprises a HDTV output.

7. The information handling system of claim 1 wherein the audiovisual appliance interface comprises an EVC output.

8. The information handling system of claim 1 wherein the audiovisual appliance interface comprises a 1394 output.

9. A method for processing audio information through a PCI Express graphics card, the method comprising:
   generating audiovisual information at an information processing system;
   communicating the audiovisual information to a PCI Express interface of the PCI Express graphics card;
   switching the audiovisual information with a PCI Express switch so that the audio information is communicated to audio processing components and the video information is communicated to video processing components;
   processing the audio and visual information with the audio and video components to output an audiovisual appliance signal.

10. The method of claim 9 wherein the audio processing components comprise:
    an AC97 interface operable to accept the audio information from the PCI Express switch for output to a CODEC; and
    a CODEC operable to accept the audio information from the AC97 interface and to output the audio information to the audiovisual appliance interface.

11. The method of claim 9 wherein the audio processing components comprise an audio controller operable to accept the audio information from the PCI Express switch and to output the audio information to the audiovisual appliance interface.

12. The method of claim 9 wherein the audiovisual appliance signal comprises a coaxial cable signal.

13. The method of claim 9 wherein the audiovisual appliance signal comprises a HDMI signal.

14. The method of claim 9 wherein the audiovisual appliance signal comprises a HDTV signal.

15. The method of claim 9 wherein the audiovisual appliance signal comprises an EVC signal.

16. The method of claim 9 wherein the audiovisual appliance signal comprises a 1394 signal.

17. A PCI Express graphics card comprising:
    a PCI Express interface operable to accept audio and visual information communicated in PCI Express format;
    a PCI Express switch in communication with the PCI Express interface and operable to switch audio information to audio processing components and video information to video processing components;
    audio processing components in communication with the PCI Express switch and operable to process the audio information to output an audiovisual appliance signal;
    video processing components in communication with the PCI Express switch and operable to process the video information to output an audiovisual appliance signal; and
    an audiovisual interface in communication with the audio processing components and the video processing components and operable to communicate the audiovisual appliance signal to an audiovisual appliance.

18. The PCI Express graphics card of claim 17 wherein the audio processing components comprise:
    an AC97 interface operable to accept the audio information from the PCI Express switch for output to a CODEC; and
    a CODEC operable to accept the audio information from the AC97 interface and to output the audio information to the audiovisual interface.

19. The PCI Express graphics card of claim 17 wherein the audio processing components comprise an audio controller operable to accept the audio information from the PCI Express switch and to output the audio information to the audiovisual interface.

20. The PCI Express graphics card of claim 17 wherein the audiovisual interface comprises a single connector having audio and visual information.

21. The PCI Express graphics card of claim 17 wherein the audiovisual interface comprises an audio connector having audio information and a video connector having visual information.

* * * * *